United States Patent
Tosa et al.

(10) Patent No.: US 9,121,489 B1
(45) Date of Patent: Sep. 1, 2015

(54) METAL GASKET

(71) Applicant: Nippon Leakless Industry Co., Ltd., Tokyo (JP)

(72) Inventors: Osamu Tosa, Saitama (JP); Shinichi Hirayama, Saitama (JP); Koichi Nakajima, Saitama (JP); Masashi Suzuki, Saitama (JP)

(73) Assignee: Nippon Leakless Industry Co., Ltd., Tokyo (JP)

( * ) Notice: Subject to any disclaimer, the term of this patent is extended or adjusted under 35 U.S.C. 154(b) by 0 days.

(21) Appl. No.: 14/640,840

(22) Filed: Mar. 6, 2015

(30) Foreign Application Priority Data

Mar. 7, 2014 (JP) ................. 2014-045469

(51) Int. Cl.
*F16J 15/08* (2006.01)
*F16H 57/029* (2012.01)

(52) U.S. Cl.
CPC ........... *F16H 57/029* (2013.01); *F16J 15/0887* (2013.01)

(58) Field of Classification Search
CPC ... F16J 15/08; F16J 15/0818; F16J 2015/085; F16J 2015/0868
See application file for complete search history.

(56) References Cited

U.S. PATENT DOCUMENTS

| | | | | |
|---|---|---|---|---|
| 1,851,948 A | * | 3/1932 | Summers ................ | 277/606 |
| 4,759,556 A | * | 7/1988 | Udagawa ................ | 277/595 |
| 4,861,047 A | * | 8/1989 | Okano .................... | 277/595 |
| 5,170,927 A | * | 12/1992 | Udagawa et al. ........ | 277/595 |
| 5,711,537 A | * | 1/1998 | Inamura et al. ......... | 277/595 |
| 2014/0097576 A1 | * | 4/2014 | Hirayama et al. ....... | 277/591 |

* cited by examiner

*Primary Examiner* — Gilbert Lee
(74) *Attorney, Agent, or Firm* — Klarquist Sparkman, LLP

(57) ABSTRACT

There is provided a metal gasket that is less susceptible to lift and thrust phenomenon of housings and can effectively function as a sealing at a blowhole. The metal gasket includes an embossment portion provided with a pair of outer inclined portions and a pair of inner inclined portions. The metal gasket and satisfies the following relationships: Mh2/Mh1=1.10–1.81, W3>W1, and W3>W2, where Mh1 and Mh2 are vertical lengths, and W1, W2 and W3 are horizontal lengths. When the gasket is sandwiched in between two housings, tip ends abut on the housing to form two seal lines, and root ends, and another tip end abut on the housing H2 to form three seal lines.

2 Claims, 15 Drawing Sheets

X1-X1 Section

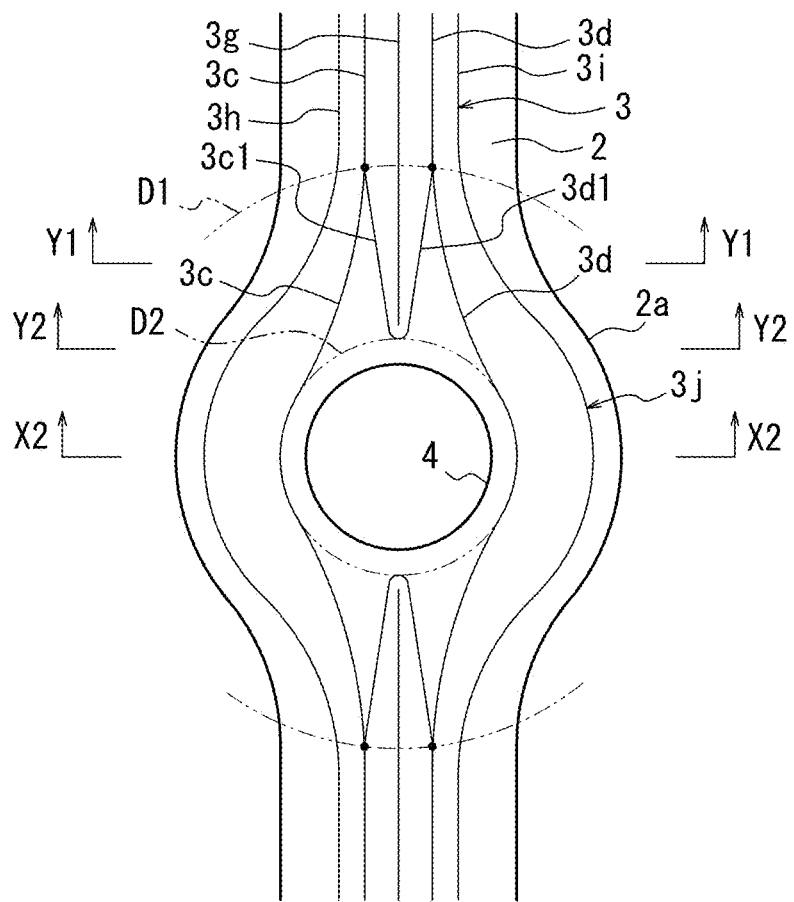

Y1-Y1 Section

Y2-Y2 Section

X2-X2 Section

FIG. 7A
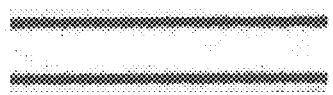
FIG. 7G
FIG. 7B
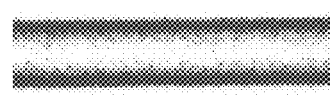
FIG. 7H
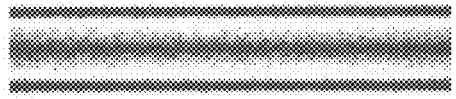
FIG. 7C
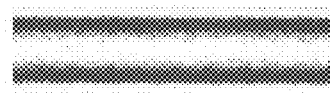
FIG. 7I
FIG. 7D  G1
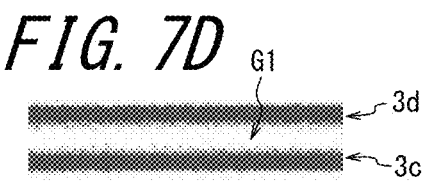
← 3d
← 3c
FIG. 7J  G3
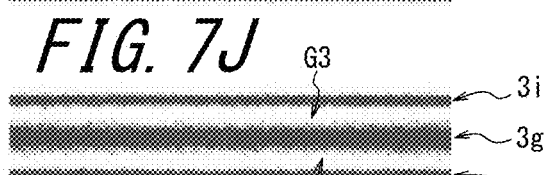
← 3i
← 3g
← 3h
G2
FIG. 7E
FIG. 7K
FIG. 7F
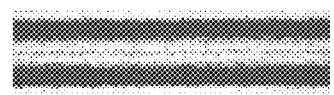
FIG. 7L

Upper part

Lower part

Upper part

Lower part

METAL GASKET

CROSS REFERENCE TO RELATED APPLICATIONS

The present application claims priority from pending Japanese Patent Application No. 2014-045469, filed Mar. 7, 2014, which is incorporated herein by reference.

TECHNICAL FIELD

The present invention relates to a metal gasket mounted between two housings accommodating a transmission or the like to prevent oil leakage. In particular, the present invention relates to a technology that ensures an effective sealing function of the metal gasket for a long time even under an occurrence of a lift-up phenomenon where a gap between the two housings becomes larger or a thrust phenomenon where housings move along the joint surfaces, or even if a blowhole exists on the joint surfaces.

BACKGROUND ART

A first housing accommodating a transmission combined with an internal combustion engine or the like, and a lid-shaped second housing are assembled together by bolts with a metal gasket being interposed therebetween. By tightening the bolts that fastening the two housings, embossments provided on the metal gasket are compressed and elastically deformed. Thus, the embossments generate restoration forces which form seal lines on the joint surfaces of the housings to prevent oil leakage or the like therefrom. Such metal gasket provided with embossments is known from, for example, openly published Japanese Patent Application Publication No. 2011-047508, openly published Japanese Utility Model Application Publication No. H2-021370, and openly published Japanese Patent Application No. H11-230355.

The embossment of a metal gasket described in openly published Japanese Patent Application Publication No. 2011-047508 has an initial shape that a flat portion with a large width projects in the cross section as shown in FIG. 5 of the publication. Prior to a state where the metal gasket is placed between the two housings H1, H2 and the bolts are tightened, a center portion of an embossment 100 abuts the housing H1, and root ends of the embossment 100 abut the lower housing H2, as shown in FIG. 11A of the present application. When the bolts are tightened, the embossment 100 is compressed as shown in FIG. 11B, and the compression causes a concave depression of the embossment 100 to form two seal lines 101, 102 with respect to the housing H1, and three seal lines 103, 104 and 105 with respect to the housing H2.

The embossment of the metal gasket described in openly published Japanese Utility Model Application Publication No. H2-021370 has an initial shape that is triangular with a sharpened top as shown in FIG. 3 in the publication. Prior to a state where the metal gasket is placed between the two housings H1, H2 and the bolts are tighten, a top portion of an embossment 200 is reversely deformed to have an M-shape as shown in FIG. 12A of the present application. As a result, two upper end portions abut the housing H1, and two lower ends abut the housing H2. The deformed top portion is suspended in the air. When the bolts are tightened, two seal lines 201, 202 are formed with respect to the housing H1, and the deformed top portion is pressed against the housing H2 to form three seal lines 203, 204 and 205, as shown in FIG. 12B.

The embossment of the metal gasket described in openly published Japanese Patent Application No. H11-230355 has an initial shape that a central portion and two side portions project in opposite directions as shown in FIG. 2 in the publication. When the metal gasket is placed between the two housings H1, H2 and the bolts are tightened, two seal lines 301, 302 are formed with respect to the housing H1, and a seal line 303 is formed with respect to the housing H2 as shown in FIG. 13 of the present application. It is noted that, for the convenience of explanation, FIG. 13 is drawn by flipping FIG. 2 of the publication upside down.

When the temperature changes associated with repeated operations and non-operations of an internal combustion engine or a gear engagement due to a shift of the transmission occurs, phenomena such as a lift-up HL which spreads the gap between the two housings H1 and H2 in the vertical direction, and a small thrust HS in the horizontal direction are observed in the housings H1, H2 as shown in FIG. 14. If such phenomena remain for a long time, the embossments lose their resilience to reduce the surface pressure of the seal lines and thus the sealing function against oil or the like is deteriorated. In particular, the embossments described in openly published Japanese Patent Application Publication No. 2011-047508 and openly published Japanese Utility Model Application Publication No. H2-021370 have a structure that increase the number of contact points against the housings by tightening the bolts to cause the deformation from the original cross-sectional shape. Once the lift-up or thrust phenomenon occurs, the number of contact points decreases to impair the sealing function.

In a case where a metal gasket is used for a transmission, the oil pressure in the transmission is relatively low. Thus, instead of using a stainless steel material which has higher resilience and is used for sealing high-pressure combustion gas, it is preferable to use a steel material which has lower resilience but is less expensive. However, when the steel material is used, because of its lower resilience, it is concerned that the sealing function is reduced significantly by the lift-up phenomenon. For this reason, the metal gasket made of a steel material and employing the technique described in openly published Japanese Patent Application Publication No. 2011-047508 and openly published Japanese Utility Model Application Publication No. H2-021370 is assumed to be readily affected by the lift-up and thrust phenomenon. In order to suppress the influence of the thrust phenomenon, it is important to place the embossments stably on the housings H1, H2. To this end, it is important to increase the surface pressure of the seal lines. However, it is difficult to increase the surface pressure of all seal lines in the case where the steel material is used, so that it has been demanded to ensure a sufficient stability of the placed embossments against the thrust phenomenon.

In addition, when the housings H1, H2 are made by die-casting, blowholes C1, C2 may be formed at any size at any position on the joint surfaces of the housings H1, H2 as shown in FIGS. 15A and 15B. The term "blowhole" as used herein refers to a fine recessed portion remaining on the joint surfaces of the housings after being produced by die-casting. When the blow holes C1, C2 are present in the vicinity of the seal lines, gaps may be formed between the blowholes C1, C2 and the seal lines. In addition, the surface pressure is reduced due to blowholes C1, C2 even if no gap is formed. Therefore, there is a risk that oil may flow over the seal lines. For this reason, the embossments described in openly published Japanese Patent Application Publication No. 2011-047508 and openly published Japanese Utility Model Application Publication No. H2-021370 have more contact points with respect to the housings as discussed above to reduce the influence of the blowholes C1, C2. However, the number of contact points may be reduced by the lift-up and thrust phenomena, so that it is still possible that oil or the like may leak. Moreover, the embossment described in openly published Japanese Patent Application No. H11-23035 has fewer contact points and thus higher surface pressure of seal lines than the embossments described in openly published Japanese Patent Application Publication No. 2011-047508 and openly published Japanese Utility Model Application Publication No. H2-021370, so that it is assumed that the number of contact points is maintained even if the lift-up and thrust phenomena occur. However, since the initial number of contact points is small, the influence of the blowholes C1, C2 is inevitable.

It is common that the bolts for fastening the housings H1, H2 are inserted into bolt holes formed on the metal gasket. In openly published Japanese Patent Application Publication No. 2011-047508, the bolt holes are provided on the outside of the embossment to prioritize the position of the embossment. In this case, however, the peripheral size of the metal gasket becomes larger, and the sizes of the housings H1, H2 also increase. For this reason, although the bolt holes are preferably provided at the widthwise central portion of the metal gasket as shown in FIG. 16A, oil may penetrate into gaps G1, G2 and G3 between seal lines due to the decrease of the surface pressure on the seal lines caused by the lift-up and thrust phenomena, or the blowholes C1, C2, flow into the bolt hole 4 through the gaps G1 to G3, and eventually flow away through a bolt through hole of the housing H1.

SUMMARY

The present invention aims to solve such conventional problems and to provide a metal gasket which is less susceptible to the lift-up and the thrust phenomena and can effectively exert sealing function against the blowholes on the joint surfaces of housings. In addition, the present invention aims to provide a metal gasket in which the seal function of the peripheral bolt holes does not impair even if the bolt holes are provided at the central portion of the metal gasket.

The present invention provides a metal gasket comprising a frame shaped base extending horizontally and an embossment portion extending along the base and sandwiched in between two housings, wherein the embossment portion includes a pair of outer inclined portions connecting to the base and projecting respectively toward one of the housings, and a pair of inner inclined portions connecting to tip ends of the respective outer inclined portions, projecting respectively toward the other of the housings and connecting to each other at their tip ends, the following relationships are satisfied:

$$Mh2/Mh1=1.10-1.81, W3>W1, \text{ and } W3>W2,$$

where, in a cross-section perpendicular to the extending direction of the embossment portion, P1 and P2 are respective intersections between a horizontal line of a front side of the base facing the one housing and inclined lines of front sides of the outer inclined portions; P3 and P4 are respective intersections between the inclined lines of the front side of the outer inclined portions and inclined lines of front sides of the inner inclined portions; P5 is an intersection between the inclined lines of the front sides of the inner inclined portions; Mh1 is a vertical length from P1 to P3; Mh2 is a vertical length from P3 to P5; W1 is a horizontal length from P1 to P5; W2 is a horizontal length from P2 to P5; and W3 is a horizontal length from P3 to P4, and wherein when the metal gasket is sandwiched in between the housings, the tip ends of the outer inclined portions abut on the one of the housings to form two seal lines, and root ends of the outer inclined portions and the tip end of the inner inclined portions abut on the other of the housings to form three seal lines.

The base is preferably formed with a bolt hole through which a bolt is inserted to fasten the housings, and the embossment portion includes a winding embossment portion in which the pair of the inner inclined portions terminate adjacent to the bolt hole and the pair of the outer inclined portions extend with the bolt hole being therebetween.

The metal gasket according to the present invention has the embossment portion placed on the base extending horizontally, and the embossment portion is composed of a pair of outer inclined portions projecting respectively toward one of the housings, and a pair of inner inclined portions projecting respectively toward the other of the housings and connecting to each other at their tip ends. The metal gasket also satisfies the following relationships:

$$Mh2/Mh1=1.10-1.81, W3>W1, \text{ and } W3>W2,$$

where Mh1 is a vertical length from P1 to P3; Mh2 is a vertical length from P3 to P5; W1 is a horizontal length from P1 to P5; W2 is a horizontal length from P2 to P5; and W3 is a horizontal length from P3 to P4. This allows the tip ends of the inner projections to be located below the base in the initial cross-sectional shape of the embossment portion, which ensures a good sealing function even under the lifting or thrust phenomenon. In addition, the embossment portions form multiple seal lines with respect to each of the housings. That is, two seal lines are formed on the one of the housings, and three seal lines are formed on the other of the housings. As a result, the sealing function can be effectively exhibited even if the blowhole is present on the joint surface.

When the base is formed with a bolt hole, the embossment portion may include a winding embossment portion in which the pair of the inner inclined portions terminate adjacent to the bolt hole and the pair of the outer inclined portions extend with the bolt hole being therebetween. As a result, a malfunction such as a leakage of oil or the like through the bolt hole can be prevented. In addition, the winding embossment portion allows the bolt hole to be placed in the central portion of the base so that the external diameter of the metal gasket can be reduced.

BRIEF DESCRIPTION OF DRAWINGS

FIG. 5 is a partial enlarged view of a peripheral portion of the bolt hole shown in FIG. 1.

FIG. 7A to 7L illustrate color changes of pressure-sensitive papers after seal line surface pressure tests are performed with respect to the base.

FIG. 11A illustrates a state where the conventional metal gasket is placed between two housings, and FIG. 11B illustrates a state where the conventional metal gasket is sandwiched between two housings.

FIG. 12A illustrates the conventional metal gasket being placed between two housings, and FIG. 12B illustrates the conventional metal gasket being sandwiched between two housings.

DESCRIPTION OF EMBODIMENTS

Embodiments of the present invention are described in detail below with reference to the drawings.

Figure 1:
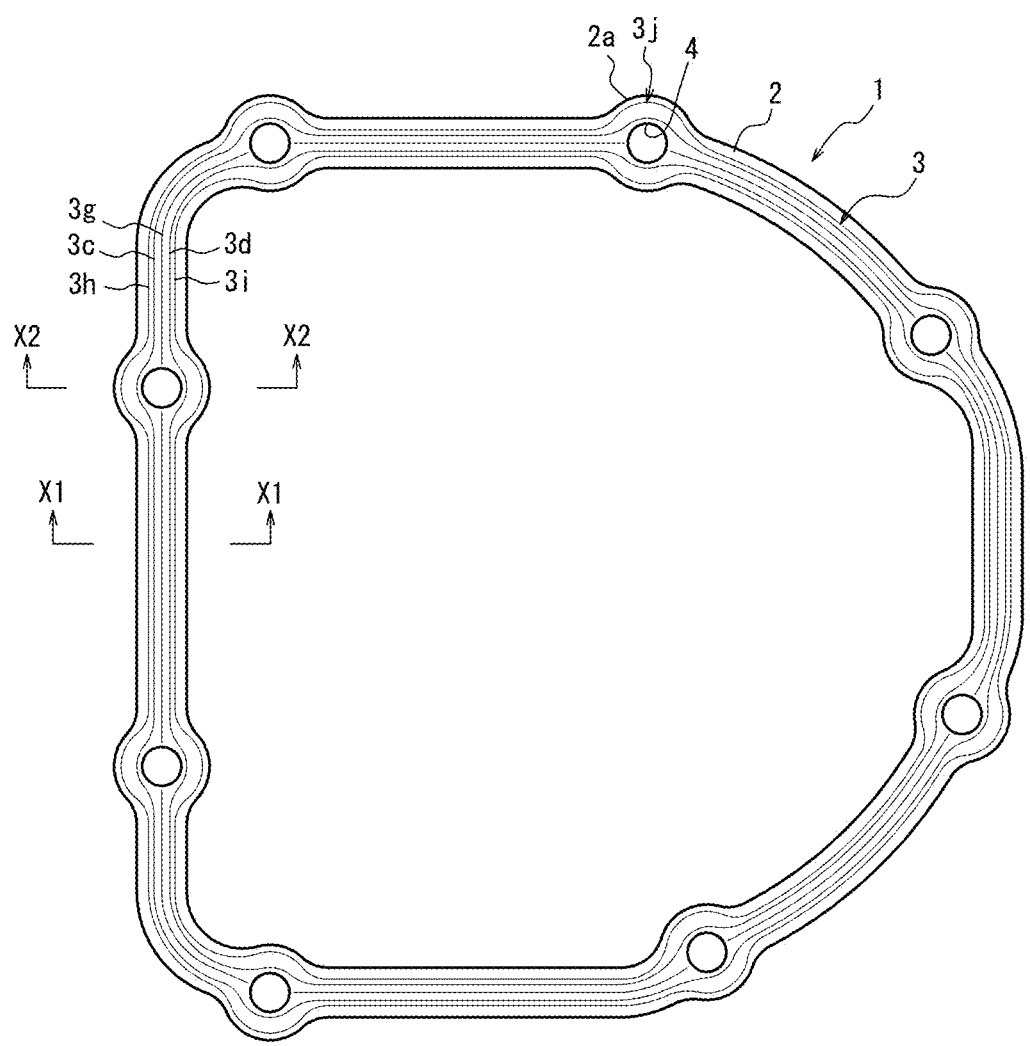
FIG. 1 is a plan view illustrating an embodiment of a metal gasket according to the present invention.
Figure 2:
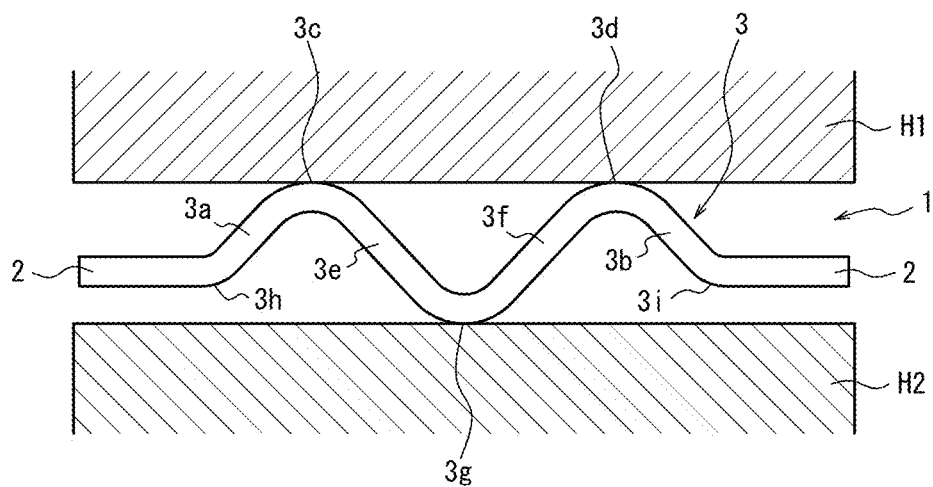
FIG. 2 is a cross-sectional view illustrating a state where the metal gasket shown in FIG. 1 is placed between two housings.

The metal gasket 1 shown in FIG. 1 is formed with a gasket substrate having an embossment portion formed by a press molding, and the gasket substrate is made of a thin metal plate (e.g. a stainless or steel material) coated with a sealing material such as rubber or the like on the surface. As shown in FIG. 2, the metal gasket is placed, for example, between two housings H1, H2 accommodating a transmission or the like, and used under a state where the metal gasket is sandwiched between the two housings H1, H2 fastened to each other by bolts or the like. The provision of the sealing material can prevent a metal-to-metal contact between the metal gasket and the housings, as well as it can provide a micro-sealing function that absorbs any small irregularities on the joint surface of the housing which have been formed when the joint surfaces is subjected to a milling process. It is noted that FIG. 2 illustrates a state prior to the metal gasket being sandwiched between the housing H1, H2 (being fastened by bolts).

The metal gasket 1 includes a frame shaped base 2 extending horizontally, and an embossment portion 3 extending along the base 2 on the widthwise inner side thereof. The base 2 of this embodiment has a general D-shape in the plan view, but the shape and size may be variously altered depending on the transmission and the housings H1, H2. The width of the base 2 of this embodiment remains the same over the entire circumference except for the later-described enlarged diameter portion. The width may also be variously altered depending on the housings or the like.

Figure 3:
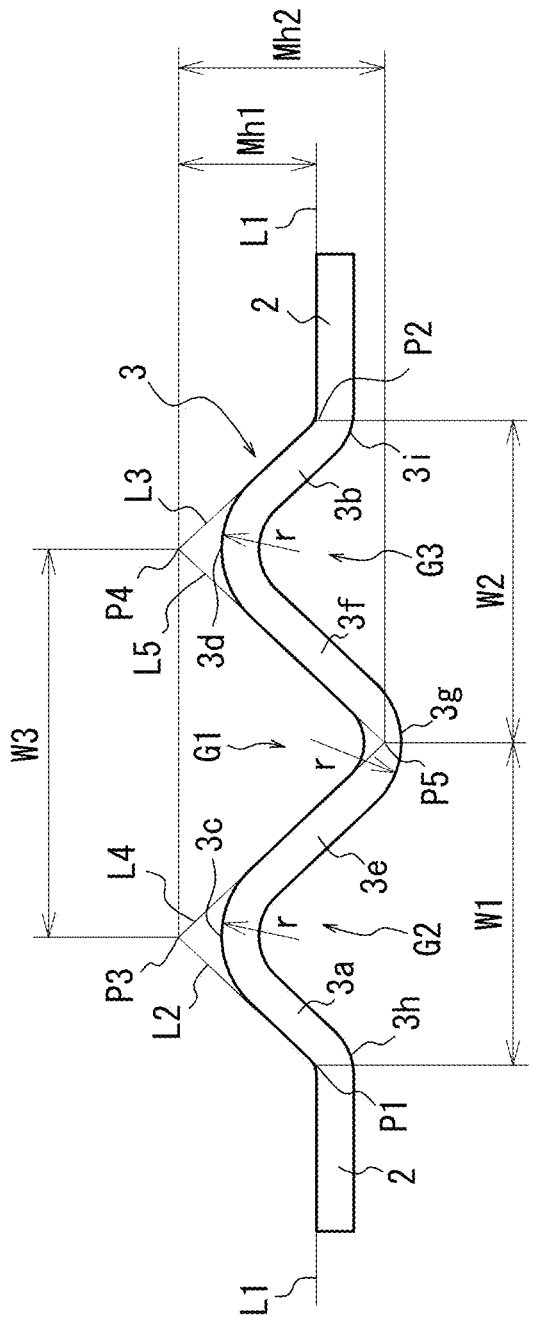
FIG. 3 is a cross-sectional view of the metal gasket shown in FIG. 1 taken along the line X1-X1.

As shown in FIG. 3, the cross-section (referred to below simply as the "cross-section") of the embossment portion 3 perpendicular to the extending direction along the base 2 has generally an "M" shape similar to the shape formed by reversely folding the tip end of a mountain. This is discussed further in detail with reference to FIGS. 2 and 3. The embossment portion 3 includes a pair of outer inclined portions 3a, 3b connecting to the base 2 and projecting respectively toward one of the housings H1, and a pair of inner inclined portions 3e, 3f connecting to tip ends 3c, 3d of the respective outer inclined portions 3a, 3b projecting respectively toward the other of the housings H2 and connecting to each other at their tip ends 3g. In FIG. 3, the reference signs 3h, 3i represent the root ends of the respective outer inclined portions 3a, 3b. Further, the tip ends 3c, 3d, 3g and the root ends 3h, 3i are the portions which abut the housings H1, H2 to form seal lines with respect to the housings H1, H2 when the metal gasket 1 is sandwiched by the housings H1, H2. (hereinafter, the same reference signs 3c-3i are assigned to the seal line formed by the tip ends 3c, 3d, 3g and the root ends 3h, 3i).

The embossment portions 3 are further discussed below. Assuming a side of the metal gasket 1 facing toward the housing H1 is a front side, the following relationships are satisfied in the cross-section as shown in FIG. 3:

$$Mh2/Mh1 = 1.10 – 1.81, W3 > W1, \text{ and } W3 > W2,$$

where P1 and P2 are respective intersections between a horizontal line L1 of the front side of the base 2 and inclined lines L2, L3 of front sides of the outer inclined portions 3a, 3b; P3 and P4 are respective intersections between the inclined lines L2, L3 of the front side of the outer inclined portions 3a, 3b and inclined lines L4, L5 of front sides of the inner inclined portions 3e, 3f; P5 is an intersection between the inclined lines L4, L5 of the front sides of the inner inclined portions 3e, 3f; Mh1 is a vertical length from P1 to P3; Mh2 is a vertical length from P3 to P5; W1 is a horizontal length from P1 to P5; W2 is a horizontal length from P2 to P5; and W3 is a horizontal length from P3 to P4. That is, the embossment portion 3 projects toward the front side beyond the base portion 2 at the tip ends 3c, 3d, and toward the back side beyond the base portion 2 at the tip end 3g. In addition, the distance between tip ends 3c and 3g (opposite from 3g) is larger than the distance between the tip end 3g and the root end 3h, and the distance between tip end 3g and the root end 3i.

Figure 4:
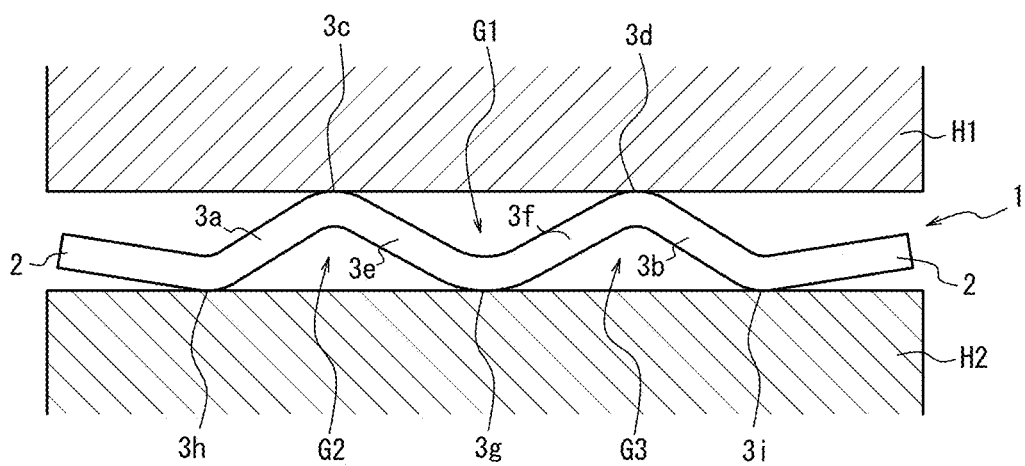
FIG. 4 is a cross-sectional view illustrating a state where bolts of the housings have been tightened from the state as shown in FIG. 2 to hold the metal gasket between the housings.

The embossment portion 3 having such shape and dimensional relationships can form two seal lines 3c, 3d on the joint surface of the housing H1 and three seal lines 3g, 3h, and 3i on the joint surface of the housing H2 when sandwiched between the housings H1, H2 as shown in FIG. 4. That is, the metal gasket 1 forms a plurality of seal lines with respect to one housing, and, in particular, three seal lines with respect to the housing H2, which allows the metal gasket 1 to be less susceptible to blowholes. Since the shapes of the metal gasket 1 before and after being sandwiched between the housings H1, H2 do not differ significantly (i.e., tip ends 3c, 3d, 3g and root ends 3h, 3i for forming seal lines project initially), the number of contact points does not change even if the lift-up phenomenon occurs, and thus the sealing function can be maintained effectively. In addition, the tip end 3g projects from the base 2 to enhance the surface pressure of the seal lines, so that the placement of the embossment portion 3 can be stabilized. The embossment portion 3 has a shape widthwise symmetric with the tip end 3g as being its center and a width W3 between the tip ends 3c, 3d facing the tip end 3g is large, so that the placement of the embossment portion 3 can be more stabilized.

As shown in FIG. 3, the tip ends 3c, 3d, 3g of this embodiment form an R-shaped cross-section. This shape enlarges the widths of the seal lines when the metal gasket is sandwiched between the housings H1, H2, and can reduce the influence of the blowholes further.

As shown in FIG. 1, the base 2 is provided with bolt holes 4 (a total of eight bolt holes in this embodiment) through which bolts are inserted to fasten the housings H1, H2 together. The bolt holes 4 are provided at the widthwise center of the base 2. An expanded diameter portion 2a is provided on the base 2 to surround the bolt holes 4.

The embossment portion 3 on the expanded diameter portion 2a is described in detail below with reference to FIGS. 3, 5 and 6A to 6C. In FIG. 5, the reference signs D1 and D2 indicate lines having sizes larger than predetermined seizes with respect to the hole-diameters of the bolt holes 4. In this embodiment, the reference sign D1 represents a line located outside of the hole-diameter of the bolt holes 4 by 7 mm, and the reference sign D2 represents a line located outside of the hole-diameter of the bolt holes 4 by 1.5 mm.

As shown in FIG. 5, the seal lines 3c, 3d, 3g, 3h, and 3i extend linearly in the area outside of the line D1. The seal line 3c is divided into two seal lines 3c and 3c1 beyond the line D1 while forming a flat portion widthwise inwardly as shown in FIG. 6. Similarly, the seal line 3d is divided into two seal lines 3d and 3d1 while forming a flat portion widthwise inwardly. The seal lines 3h, 3i extend along the outer edge of the expanded diameter portion 2a with the bolt hole 4 in being situated therebetween. That is, the outer side portion of the expanded diameter portion 2a in the radial direction spreads from the line D1 radially outwardly so as to surround the bolt holes 4 and has the largest spread width at the position passing through the center of the bolt holes 4. Subsequently, the outer side portion is shaped so as to converge toward the line D1 on the opposite side.

Figure 6A:
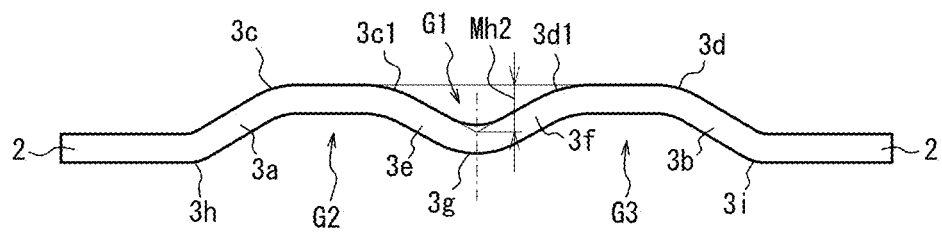
FIG. 6A is a cross-sectional view taken along the line Y1-Y1 of FIG. 5.
Figure 6B:
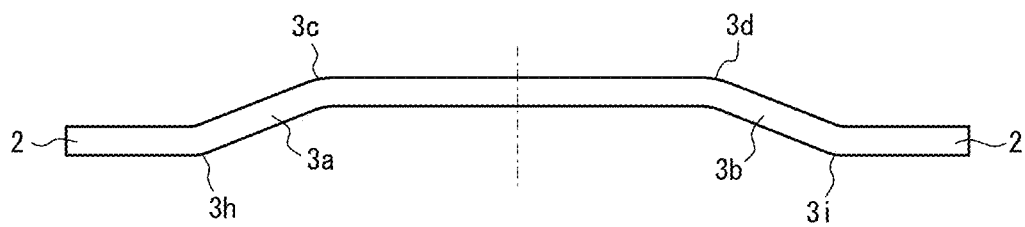
FIG. 6B is a cross-sectional view taken along the line Y2-Y2 of FIG. 5.

The vertical length Mh2 of the seal line 3g has a length at outside of the line D1 as shown in FIG. 3, and, after passing the line D1, it gradually reduces the length as shown in FIG. 6A to eventually disappear at inside of the line D2 as shown in FIG. 6B. The seal lines 3c1, 3d1 divided from the seal lines 3c, 3d, respectively, approach to each other after passing the line D1, and merge together at the line D2 as shown in FIG. 5. That is, a gap G1 formed above the seal line 3g shown in FIGS. 3 and 6A gradually decreases after passing the line D1, and completely disappears at the line D2.

Figure 6C:
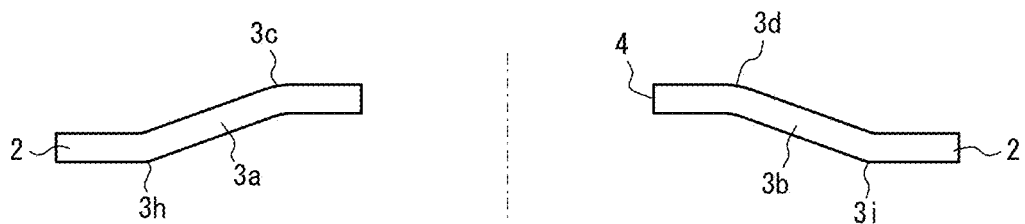
FIG. 6C is a cross-sectional view taken along the line X2-X2 of FIG. 5.
Figure 16A:
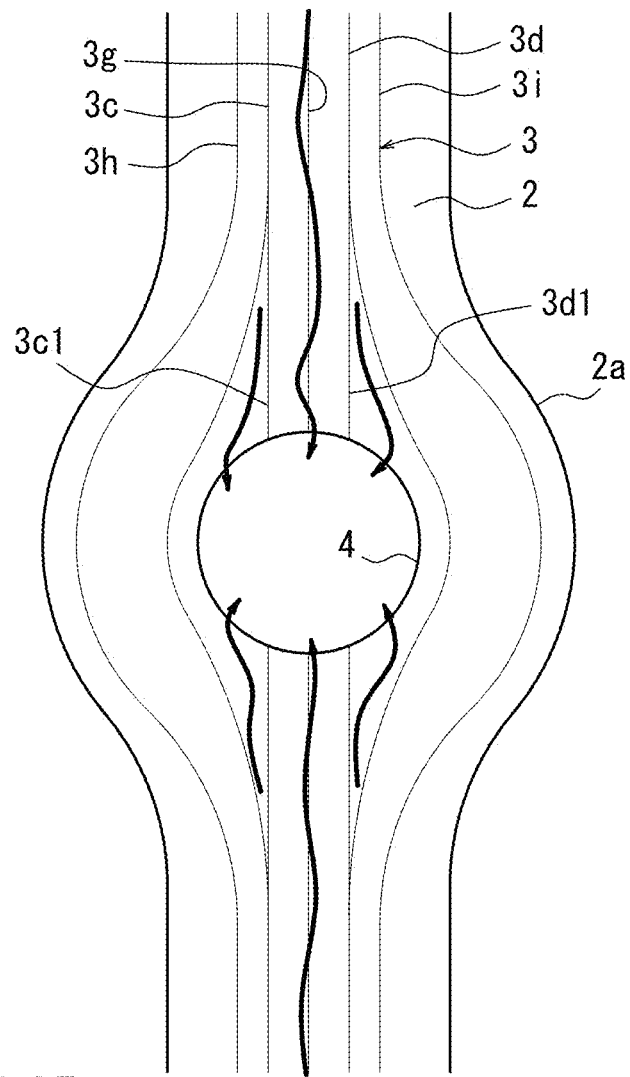
FIG. 16A is a plan view illustrating a state where oil flows into the bolt hole.
Figure 16B:
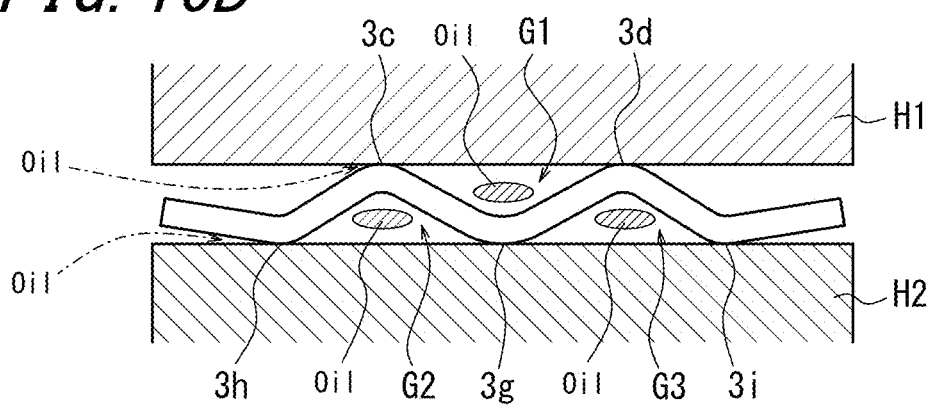
FIG. 16B is a cross-section view illustrating the state where oil flows into the bolt hole.

In this way, the embossment portion 3 extends at the expanded diameter portion 2a so as not to pass through but to detour the bolt hole 4 (hereinafter, the embossment portion at the expanded diameter portion 2a is referred to as "the winding embossment portion 3j"). Thus, even if oil or the like enters the gap G1, G2 or G3 between the seal lines, it can be prevented from entering into the bolt hole, as shown in FIG. 16B. In addition, the inner cross-section of the line D2 at the winding embossment portions 3j has a shape similar to a half embossment with a single slope structure as shown in FIGS. 6B-6C. That is, the winding embossment portion has a cross-sectional shape that can be compressed easier than the M-shape that the rest of the embossment portion 3 has, so that, when it is tightened with a bolt, the embossments can be completely compressed at immediately below the bolt. Therefore, it is possible to more reliably prevent the outflow of oil from the bolt holes 4.

EXAMPLES

Figure 13:
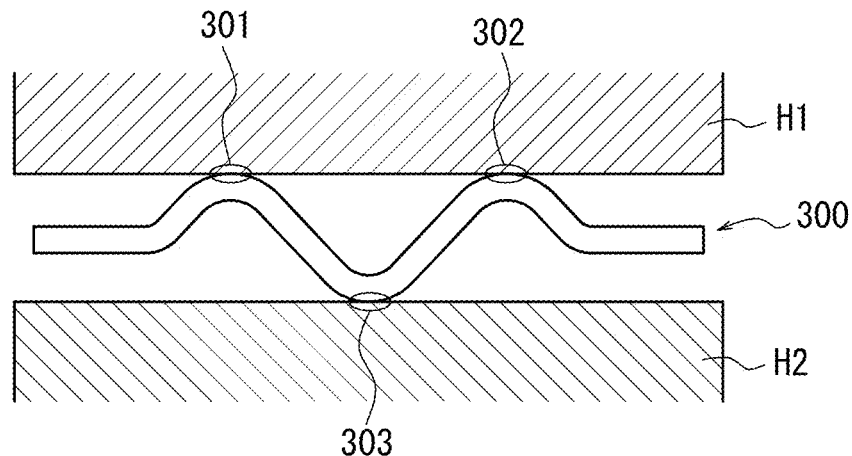
FIG. 13 illustrates yet another conventional metal gasket being sandwiched between two housings.
Figure 14:
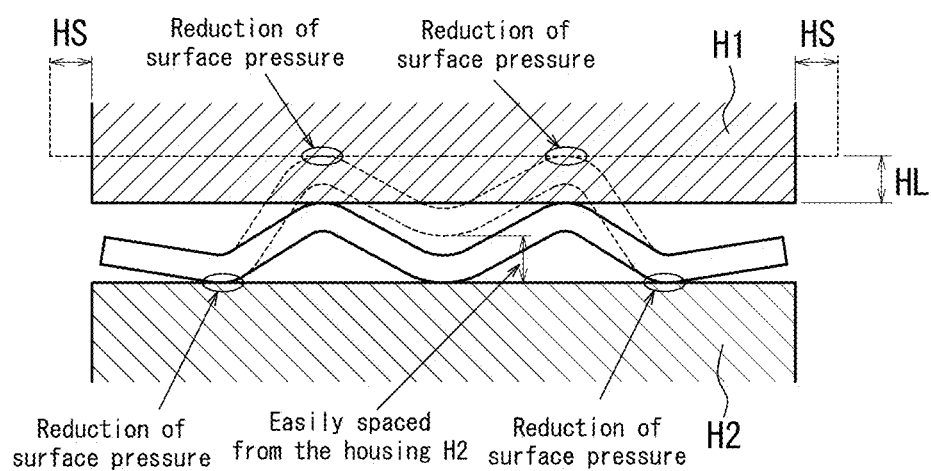
FIG. 14 is a plan view of a conventional metal gasket for illustrating the lift-up and thrust phenomena of housings.
Figure 15A:
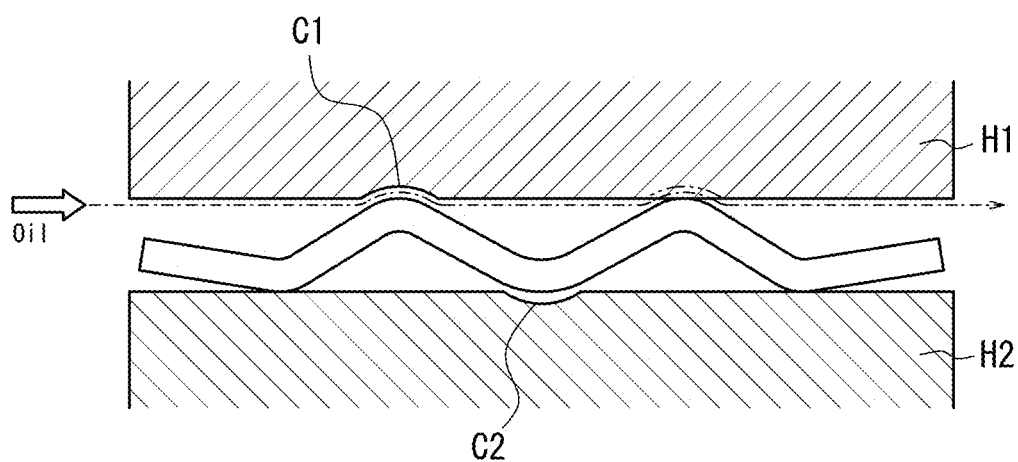
FIG. 15A is a cross-sectional view illustrating blowholes formed on the joint surfaces of the housings.
Figure 15B:
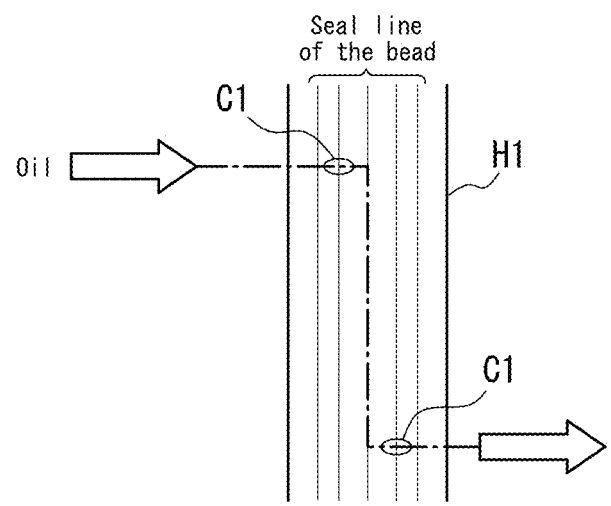
FIG. 15B is a plan view illustrating the blowholes formed on the joint surfaces of the housings.

Inventors of the present invention have paid attention to the prior art of a metal gasket 300 as shown in FIG. 13 in order to verify the performance of the metal gasket configured as described above. In other words, in order to increase the surface pressure of the seal line at the tip end 3g, it is necessary to make the value of Mh2 larger than the value of Mh1 (i.e., to set the value of Mh2/Mh1 to 1 or more). However, when the value of Mh2/Mh1 is excessively large, there will be only a total of three seal lines formed as is the case with the metal gasket 300. In this connection, the inventors assumed that there might be a particularly preferred range for the relationship of Mh2/Mh1, and experimentally made various metal gaskets with Mh1 being fixed to 0.21 mm, and Mh2 divided into 12 levels within a range of 0.13 mm-0.43 mm. All of the metal gaskets thus made were made of steel material, and satisfy the relationships of W3>W1 and W3>W2. The tip ends 3c, 3d, and 3g had an R-shape (radius r=2.5 mm), and the rubber used as seal material had a thickness of 24 µm and a hardness of Hs70.

The performances of the metal gasket were examined by an oil pressure seal test and a seal line surface pressure test. The oil pressure seal test was carried out for the metal gasket as shown in FIGS. 1 and 3. In the test, the base 2 extending lineally and located between two expanded diameter portions 2a was clamped by housing jigs, pressurized oil was allowed to flow into the gap among the housing jigs, and whether the oil leaked over the metal gasket was verified. The housing jigs were so fabricated that a blowhole presumably occurs, and thus were provided with recessed portions (herein, having a diameter of 2 mm) at positions immediately above each of the tip ends 3c, 3d and 3g and immediately below each of the root ends 3h, 3i when the metal gasket was clamped. In addition, the gap between the recessed portions corresponding to the tip ends 3c, 3d was 3 mm.

As shown in FIG. 4, the seal line surface pressure test was carried out in such a manner that the pressure sensitive papers were placed between the upper housing and the metal gasket as well as between the lower housing and the metal gasket, and the color changes of the pressure sensitive papers after the metal gasket was clamped were used for evaluations. A pressure measurement film (for low pressure usage) available from Fuji Film Co., Ltd. was used as the pressure sensitive paper. In FIGS. 7A-7L, the colored (black) portions indicate portions where the color of the pressure sensitive paper had been changed. In addition, FIGS. 7A to 7F show the color changes of the pressure sensitive paper placed between the upper housing and the metal gasket, and FIGS. 7G to 7L show the color changes of the pressure sensitive paper placed between the lower housing and the metal gasket. Further, the results of Comparative Example 1 are shown in FIGS. 7A and 7G, the results of Comparative Example 2 are shown in FIGS. 7B and 7H, the results of Comparative Example 4 are shown in FIGS. 7C and 7I, the results of Example 1 are shown in FIGS. 7D and 7J, the results of Example 6 are shown in FIGS. 7E and 7K, and the results of Comparative Example 5 are shown in FIGS. 7F and 7L. The corresponding relationships between the color changes of the pressure sensitive paper and the tip ends 3c, 3d, and 3g and root ends 3h, 3i are represented in FIGS. 7D and 7J. The color changes of the pressure-sensitive paper for Comparative Example 3, Examples 2 to 5, and Comparative Example 6 are omitted. The distribution of the colored portions in Comparative Example 3 is denser than that in Comparative Example 2, but is less dense than that in Comparative Example 4. The distribution of the colored portions in Examples 2-5 is denser than that in Comparative Example 1, but less dense than that in Comparative Example 6, and the density increases from Examples 2 to 5 in this order. In addition, likewise in Comparative Example 5, it is observed that Comparative Example 6 has a line which is white out in the widthwise central portion of the seal line 3g.

The results of the two tests and the specs of the metal gasket used are shown in Table 1.

TABLE 1

Figure 11A:
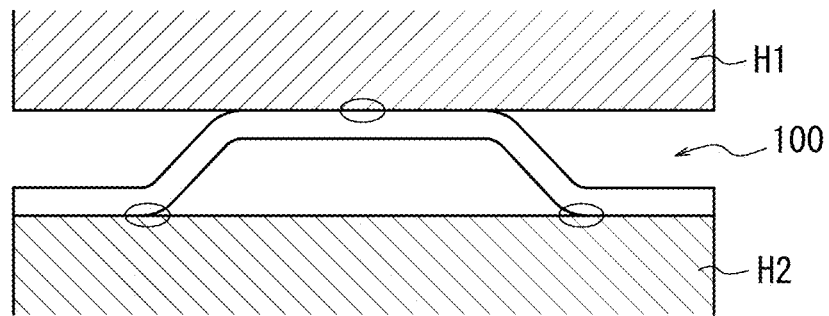
FIGS. 11A and 11B show a conventional metal gasket where
Figure 11B:
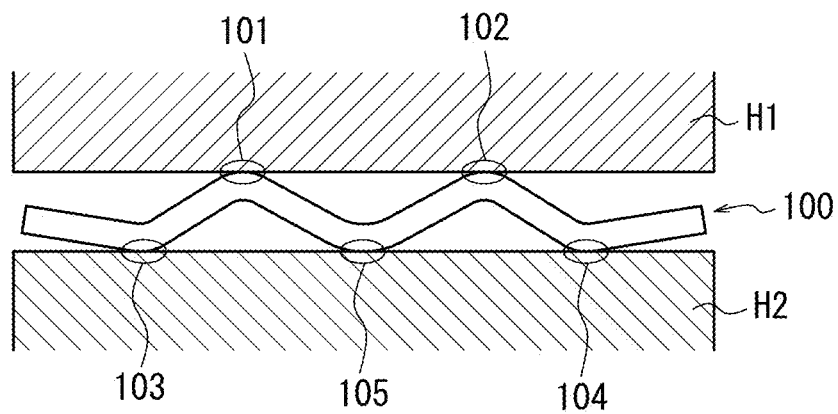
Figure 12A:
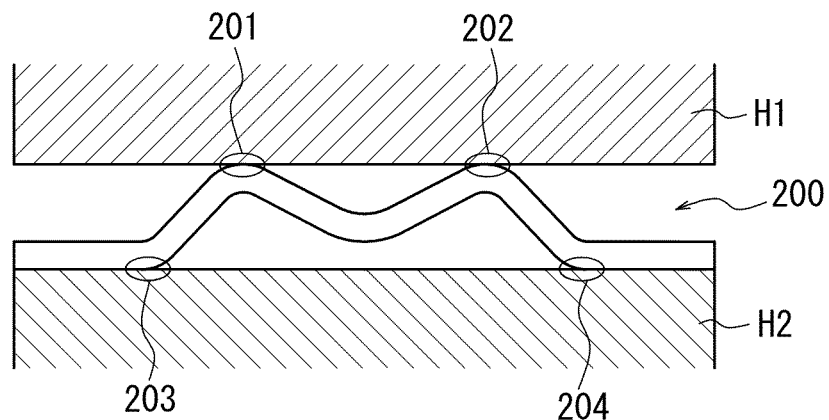
FIGS. 12A and 12B show another conventional metal gasket, where
Figure 12B:
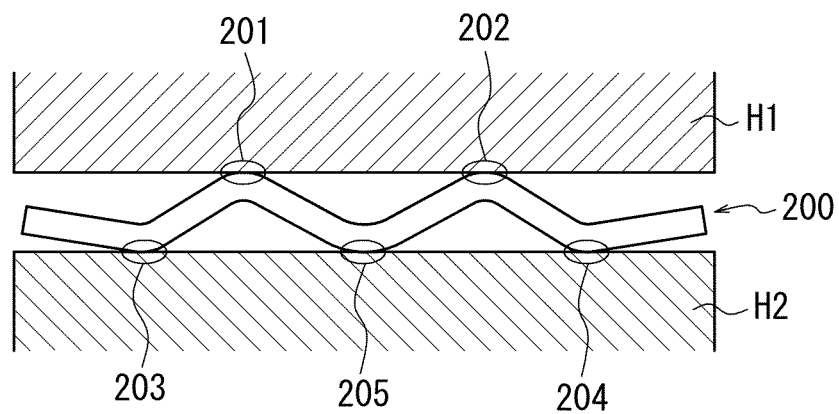

| | Shape | Mh2 (mm) | Mh2/ Mh1 | Oil Pressure Seal Test | Seal Line Surface Pressure Test | |
|---|---|---|---|---|---|---|
| Comparative Example 1 | FIG. 11 | 0.13 | 0.57 | NG | NG | FIGS. 7A, 7G |
| Comparative Example 2 | FIG. 12 | 0.15 | 0.71 | NG | NG | FIGS. 7B, 7H |
| Comparative Example 3 | FIG. 3 | 0.17 | 0.81 | NG | NG | — |
| Comparative Example 4 | FIG. 3 | 0.2 | 0.95 | Good | NG | FIGS. 7C, 7I |
| Example 1 | FIG. 3 | 0.23 | 1.10 | Good | Good | FIGS. 7D, 7J |
| Example 2 | FIG. 3 | 0.26 | 1.23 | Good | Good | — |
| Example 3 | FIG. 3 | 0.3 | 1.43 | Good | Good | — |
| Example 4 | FIG. 3 | 0.32 | 1.52 | Good | Good | — |
| Example 5 | FIG. 3 | 0.35 | 1.67 | Good | Good | — |
| Example 6 | FIG. 3 | 0.38 | 1.81 | Good | Good | FIGS. 7E, 7K |
| Comparative Example 5 | FIG. 3 | 0.41 | 1.95 | Good | NG | FIGS. 7F, 7L |
| Comparative Example 6 | FIG. 3 | 0.43 | 2.04 | Good | NG | — |

Oil Pressure Test:
  Good=No leakage of oil was observed
  NG=Leakage of oil was observed
Seal Line Surface Pressure Test:
  Good=surface pressure of the seal line was sufficient
  NG=surface pressure of the seal line was insufficient During the oil pressure seal test, the oil leaked over the metal gasket in Comparative Examples 1 to 3. In addition, during the seal line surface pressure test the colored portions of the seal lines (seal line 105 in FIG. 11B, seal line 205 in FIG. 12B) located in the lower center were sparse in Comparative Example 1 and Comparative Example 2 as shown in FIGS. 7G and 7H, which indicates that the surface pressure of the seal line was insufficient. The colored portions of the seal lines 3c, 3d in Comparative Example 5 and Comparative Example 6 were sparse as shown in FIG. 7F, and there was a line which was white out at the widthwise central portion of the seal line 3g as shown in FIG. 7L. That is, it was observed that the surface pressure on the seal lines 3c, 3d, and 3g were insufficient. On the other hand, the results of Examples 1 to 6 were good. That is, when the embossment portions having the shape shown in FIG. 2 satisfied the relationships of Mh2/Mh1=1.10–1.81, W3>W1, and W3>W2, it was confirmed that the leakage of oil could be prevented as well as the surface pressure of the seal lines could be secured. Even if the blowholes were located immediately above or immediately below the seal lines, as long as they had the diameter of 2 mm or less, it was observed that the oil leakage could be prevented. Also, even if the blowholes had the diameter of 3 mm, as long as they were located between two seal lines, it was observed that the oil leakage could be prevented.

Figure 8A:
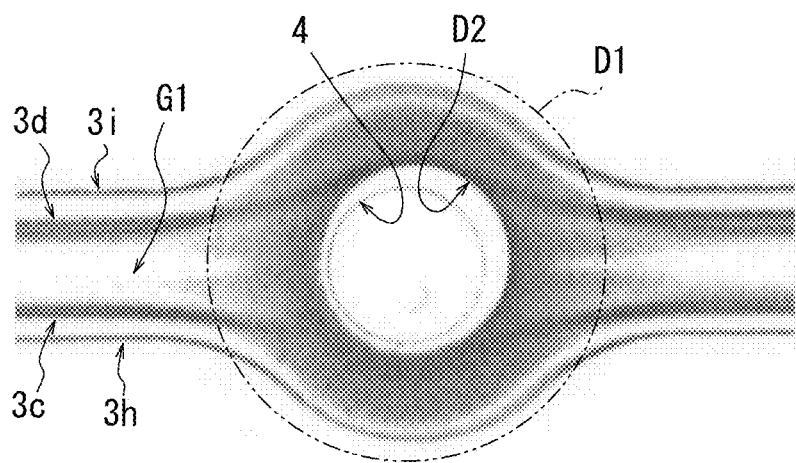
FIGS. 8A and 8B illustrate color changes of pressure-sensitive papers after seal line surface pressure tests are performed with respect to the peripheral portion of the bolt hole shown in FIG. 5
Figure 8B:
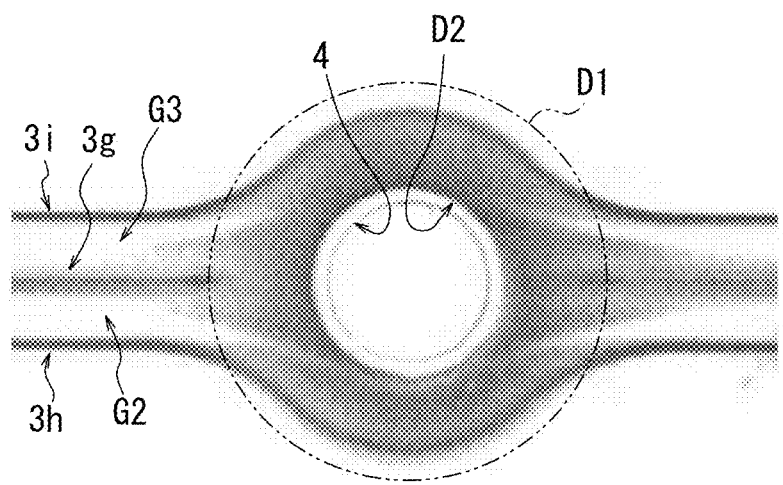
Figure 9A:
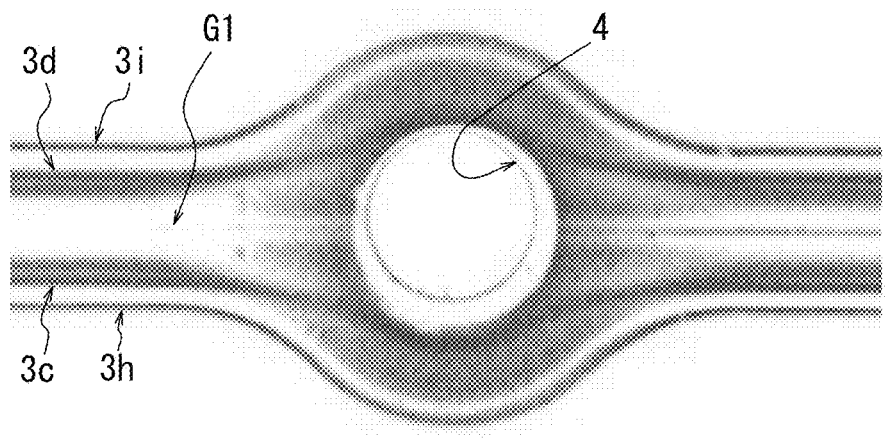
FIGS. 9A and 9B illustrate color changes of pressure-sensitive papers after seal line surface pressure tests are performed with respect to the peripheral portion of the bolt hole shown in FIG. 16.
Figure 9B:
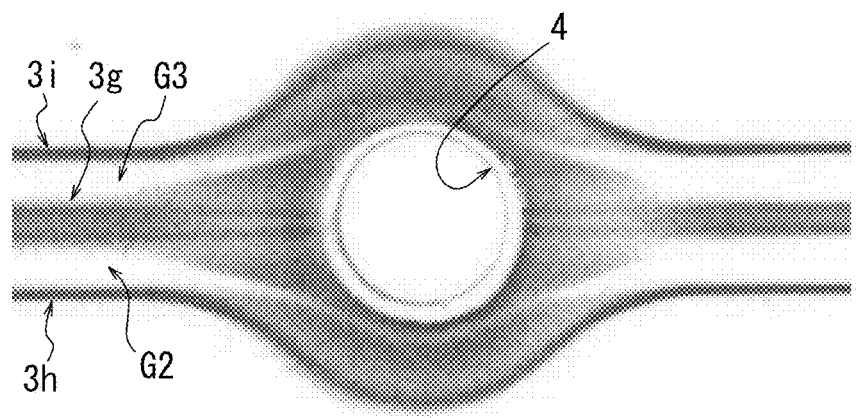

The expanded diameter portion provided with a bolt hole was evaluated with the above-mentioned seal line surface pressure test. FIGS. 8A-8B show the results of the tests performed for the expanded diameter portions according to the present invention illustrated in FIG. 1, FIG. 5, and FIG. 6. FIG. 8A illustrates the result obtained between the upper housing and the metal gasket, and FIG. 8B illustrates the result obtained between the lower housing and the metal gasket. FIGS. 9A and 9B show the result of the test performed for the expanded diameter portion in which the seal line 3g was connected to the bolt hole 4 (see FIG. 16). Furthermore, FIG. 9A illustrates the result obtained between the upper housing and the metal gasket, and FIG. 9B illustrates the result obtained between the lower housing and the metal gasket.

In FIGS. 9A and 9B, the white line passes over the colored portion surrounding the bolt hole 4. That is, the metal gasket 1 in which the seal line 3g is connected to the bolt hole 4 has an area where the surface pressure of the seal line is insufficient around the bolt hole as shown in FIG. 16A, so that, when oil enters the gaps G1 to G3 as shown in FIG. 16B, the oil may flow into the bolt hole 4. In contrast, the entire periphery area of the bolt hole 4 is surrounded by the colored portions in FIGS. 8A and 8B. That is, since the periphery area of the bolt hole 4 is clamped by the housings with a sufficient surface pressure in the metal gasket shown in FIG. 5, even if the oil penetrates into the gaps G1 to G3, the oil leakage from the bolt hole 4 can be prevented.

Moreover, if the sealing material applied on the surface of the metal gasket 1 has too small thickness, it cannot sufficiently exhibit the sealing property; if the sealing material has too large thickness, a torque down which reduces the bolt axial force may easily occur due to temperature changes and the plastic deformation of the sealing material associated with the repetition of the operation and non-operation of the internal combustion engine. Therefore, in order to evaluate the influences of the film thickness of the rubber used as the sealing material, an oil pressure seal test and a measurement of stress relaxation rate were carried out.

For the oil pressure seal test, metal gaskets with film thicknesses of the rubber of 16 μm, 24 μm, 35 μm, 47 μm, and 57 μm were prepared. The metal gaskets were clamped by the above-mentioned housing jigs and pressurize oil was supplied. The oil leakage was verified with respect to each metal gasket. The hardness of rubber of all of the metal gaskets was Hs70. The shape of the metal gasket was, among Comparative Examples 1-4 and Examples 1-8, similar to that of Comparative Example 4 of which the surface pressure of the seal line was determined as insufficient although the oil leakage was not observed. As a result, although an oil leakage was observed in the metal gasket with the rubber having a film thickness of 16 μm, no oil leakage was observed in the metal gaskets with the rubber having a film thickness of 24 μm or more. Therefore, it is found that the film thickness of the rubber not less than 24 μm provides a sufficient sealing property.

Figure 10:
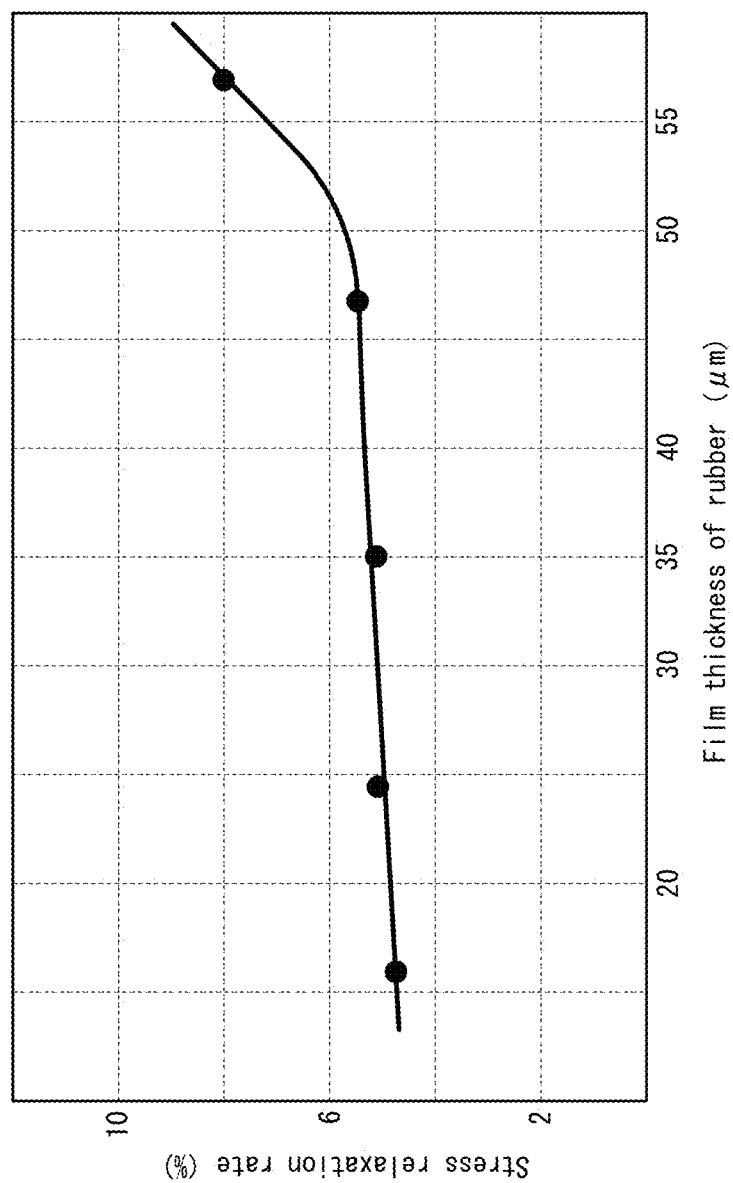
FIG. 10 illustrates measurement results of stress relaxation rate.

For the measurement of the stress relaxation rate, test specimens were prepared by cutting metal gaskets with film thicknesses of the rubber of 16 μm, 24 μm, 35 μm, 47 μm, and 57 μm into predetermined sizes. the test specimens were placed between two pieces of plates, and the plates were fastened by bolts to clamp the test specimens with predetermined bolt axial force. After the test specimens were left at predetermined temperature for a predetermined time, the reduction of the bolt axial force was evaluated. Specifically, a strain gauge had been attached to the bolt, and, for each of the test specimens, an elongation (elongation before heating) S1 of the bolt while being clamped with predetermined bolt axial force and a restoration length (restoration after heating and cooling) S2 obtained when the bolt was loosened after the heat treatment and cooling. A stress relaxation rate (%) for each of the test specimens was calculated by the formula: stress relaxation rate (%)=(S1−S2)/S1*100. The results are shown in FIG. 10. FIG. 10 shows that no significant change was observed in cases of the film thicknesses of rubber of 16 μm to 47 μm, significant changes of the stress relaxation rate (great reductions of the bolt axial force) were observed in cases of the film thickness of rubber of 47 μm to 57 μm. Accordingly, in order to maintain the sealing property for a long period of time while absorbing the temperature change, it was found that the film thickness of rubber is preferably 47 μm or less.

That is, from the results of the oil pressure seal test and the measurement of stress relaxation rate, it was found that the film thickness of rubber is preferably in the range of 24 μm to 47 μm to maintain a sufficient sealing performance for a long period of time.

In accordance with the present invention, it is possible to provide a metal gasket which can be less susceptible to the lift and thrust phenomena, and is capable of effectively exhibiting sealing function against blowholes on the joint surfaces of housings. Moreover, it is possible to provide a metal gasket in which the sealing function is not impaired even if the bolt holes are provided at the central portion of the metal gasket.

The invention claimed is:

1. A metal gasket comprising a frame shaped base extending horizontally and an embossment portion extending along the base and sandwiched in between two housings, wherein the embossment portion includes a pair of outer inclined portions connecting to the base and projecting respectively toward one of the housings, and a pair of inner inclined portions connecting to tip ends of the respective outer inclined portions, projecting respectively toward the other of the housings and connecting to each other at their tip ends, the following relationships are satisfied:

$Mh2/Mh1=1.10-1.81, W3>W1$, and $W3>W2$, where, in a cross-section perpendicular to the extending direction of the embossment portion, P1 and P2 are respective intersections between a horizontal line of a front side of the base facing the one housing and inclined lines of front sides of the outer inclined portions; P3 and P4 are respective intersections between the inclined lines of the front side of the outer inclined portions and inclined lines of front sides of the inner inclined portions; P5 is an intersection between the inclined lines of the front sides of the inner inclined portions; Mh1 is a vertical length from P1 to P3; Mh2 is a vertical length from P3 to P5; W1 is a horizontal length from P1 to P5; W2 is a horizontal length from P2 to P5; and W3 is a horizontal length from P3 to P4, and wherein when the metal gasket is sandwiched in between the housings, the tip ends of the outer inclined portions abut on the one of the housings to form two seal lines, and root ends of the outer inclined portions and the tip end of the inner inclined portions abut on the other of the housing to form three seal lines.

2. The metal gasket according to claim 1, wherein the base is formed with a bolt hole through which a bolt is inserted to fasten the housings, and the embossment portion includes a winding embossment portion in which the pair of the inner inclined portions terminate adjacent to the bolt hole and the pair of the outer inclined portions extend with the bolt hole being therebetween.

\* \* \* \* \*